(12) United States Patent
Nakada et al.

(10) Patent No.: US 10,316,716 B2
(45) Date of Patent: Jun. 11, 2019

(54) EXHAUST PURIFICATION SYSTEM AND METHOD FOR RESTORING NOX PURIFICATION CAPACITY

(71) Applicant: ISUZU MOTORS LIMITED, Tokyo (JP)

(72) Inventors: Teruo Nakada, Yokohama (JP);
Takayuki Sakamoto, Fujisawa (JP);
Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 65 days.

(21) Appl. No.: 15/540,017

(22) PCT Filed: Dec. 25, 2015

(86) PCT No.: PCT/JP2015/086375
§ 371 (c)(1),
(2) Date: Jun. 26, 2017

(87) PCT Pub. No.: WO2016/104774
PCT Pub. Date: Jun. 30, 2016

(65) Prior Publication Data
US 2017/0362979 A1     Dec. 21, 2017

(30) Foreign Application Priority Data

Dec. 26, 2014     (JP) ................................. 2014-264965

(51) Int. Cl.
*F01N 3/08*     (2006.01)
*F01N 3/10*     (2006.01)
(Continued)

(52) U.S. Cl.
CPC ....... *F01N 3/0885* (2013.01); *B01D 53/9422* (2013.01); *B01D 53/9495* (2013.01);
(Continued)

(58) Field of Classification Search
CPC ...... F01N 3/021; F01N 3/0814; F01N 3/0842; F01N 3/0885; F01N 3/103; F01N 3/36;
(Continued)

(56) References Cited

U.S. PATENT DOCUMENTS

2004/0163381 A1     8/2004  Shirakawa et al.
2006/0225407 A1*   10/2006  Tahara .................. F01N 3/0253
                                                    60/286
(Continued)

FOREIGN PATENT DOCUMENTS

CN          1542264 A       11/2004
EP          1452713 A2       9/2004
(Continued)

OTHER PUBLICATIONS

Extended European Search Report for related European Application No. 15873342.8, dated Jun. 6, 2018; 8 pages.
(Continued)

*Primary Examiner* — Audrey K Bradley
(74) *Attorney, Agent, or Firm* — Procopio, Cory, Hargreaves & Savitch LLP

(57) ABSTRACT

An exhaust purification system includes: a NOx reduction catalyst for reducing and purifying NOx in an exhaust gas; a catalyst regeneration control module for executing a catalyst regeneration process of restoring a NOx purification capacity of the NOx reduction catalyst by switching an air-fuel ratio of the exhaust gas from a lean state to a rich state by using in parallel an air system control to reduce an intake air amount and an injection system control to increase a fuel injection amount; an exhaust gas temperature sensor that is provided on a downstream side of the NOx reduction catalyst on an exhaust passageway; a catalyst temperature estimating module for estimating a catalyst temperature of the NOx reduction catalyst; a temperature sensor value
(Continued)

estimating module for estimating a sensor value of the exhaust gas temperature sensor; and an abnormality determination module for determining on an abnormality of a catalyst regeneration process.

6 Claims, 10 Drawing Sheets

(51) Int. Cl.
| | |
|---|---|
| *F01N 11/00* | (2006.01) |
| *F02D 41/02* | (2006.01) |
| *B01D 53/94* | (2006.01) |
| *F01N 13/00* | (2010.01) |
| *F01N 3/36* | (2006.01) |
| *F01N 9/00* | (2006.01) |
| *F01N 3/021* | (2006.01) |

(52) U.S. Cl.
CPC ........... *F01N 3/021* (2013.01); *F01N 3/0814* (2013.01); *F01N 3/0842* (2013.01); *F01N 3/103* (2013.01); *F01N 3/36* (2013.01); *F01N 9/00* (2013.01); *F01N 11/002* (2013.01); *F01N 11/005* (2013.01); *F01N 13/008* (2013.01); *F01N 13/009* (2014.06); *F02D 41/0235* (2013.01); *B01D 2255/91* (2013.01); *F01N 2260/04* (2013.01); *F01N 2550/02* (2013.01); *F01N 2560/06* (2013.01); *F01N 2610/03* (2013.01); *F01N 2900/0601* (2013.01); *F01N 2900/1404* (2013.01); *F01N 2900/1602* (2013.01); *Y02T 10/24* (2013.01); *Y02T 10/47* (2013.01)

(58) Field of Classification Search
CPC ........ F01N 9/00; F01N 11/002; F01N 11/005; F01N 13/008; F01N 13/009; F01N 2260/04; F01N 2550/02; F01N 2560/06; F01N 2610/03; F01N 2900/0601; F01N 2900/1404; F01N 2900/1602; B01D 53/9422; B01D 53/9495; B01D 2255/91

See application file for complete search history.

(56) References Cited

U.S. PATENT DOCUMENTS

| | | | |
|---|---|---|---|
| 2009/0049824 A1 | 2/2009 | Kojima et al. | |
| 2010/0115924 A1* | 5/2010 | Gabe | B01D 53/9409 60/285 |

FOREIGN PATENT DOCUMENTS

| | | | |
|---|---|---|---|
| JP | 2005-069218 A | | 3/2005 |
| JP | 2005069218 A | * | 3/2005 |
| JP | 2005256671 A | | 9/2005 |
| JP | 2008138603 A | | 6/2008 |
| JP | 2008-267178 A | | 11/2008 |
| JP | 2009-047086 A | | 3/2009 |
| JP | 2009097343 A | | 5/2009 |

OTHER PUBLICATIONS

International Search Report and Written Opinion for PCT App No. PCT/JP2015/086375 dated Mar. 8, 2016, 7 pgs.
First Office Action for related CN App No. 201580071034.2 dated Oct. 26, 2018, 18 pgs.

* cited by examiner

EXHAUST PURIFICATION SYSTEM AND METHOD FOR RESTORING NOX PURIFICATION CAPACITY

CROSS-REFERENCE TO RELATED APPLICATIONS

This application is a U.S. National Stage entry of PCT Application No. PCT/JP2015/086375, filed on Dec. 25, 2015, which claims priority to Japanese Patent Application No. 2014-264965, filed Dec. 26, 2014, the contents of which are incorporated herein by reference.

TECHNICAL FIELD

The present invention relates to an exhaust purification system and a method for restoring NOx purification capacity.

BACKGROUND ART

Conventionally, a NOx storage reduction catalyst been known as a catalyst which reduces and purifies nitrogen compound (NOx) in exhaust gases discharged from an internal combustion engine. The NOx storage reduction catalyst adsorbs NOx included in exhaust gases when the exhaust gases are in a lean atmosphere, while when the exhaust gases are in a rich atmosphere, the NOx storage reduction catalyst reduces and purifies the adsorbed NOx with hydrocarbons contained in the exhaust gases into harmless gas for discharge.

In addition, the NOx storage reduction catalyst also adsorbs sulfur oxides (hereinafter, referred to as SOx) contained in exhaust gases. The increase in the amount of adsorption of SOx causes a problem that the NOx purification capacity of the NOx storage reduction catalyst is reduced. Because of this, in the event that the SOx adsorption amount reaches a predetermined amount, in order to restore the NOx storage reduction catalyst from the sulfur poisoned state by releasing the adsorbed SOx from the NOx storage reduction catalyst, a so-called SOx purging needs to be carried out periodically in which unburned fuel is supplied to the oxidation catalyst disposed upstream of the reduction catalyst through post injection or exhaust pipe injection to increase the temperature of exhaust gases to the SOx desorption temperature (for example, refer to Patent Literature 1).

PRIOR ART LITERATURES

Patent literature

Patent Literature 1: JP-A-2009-047086

SUMMARY OF THE INVENTION

Problem that the Invention is to Solve

In this type of device, in performing a catalyst regeneration process such as SOx purging, the amount of injection of fuel through exhaust pipe injection or post injection is controlled by means of a feedback control based on a deviation which is a difference between a target temperature and an estimated catalyst temperature. However, in case an increased amount of injection of fuel from an exhaust injector or a direct injection injector exceeds a correctable range, the heat value of HC in the interior of the catalyst is increased dramatically, leading to a problem that a melting damage of the catalyst is called for.

An exhaust purification system and a method for restoring NOx purification capacity which are disclosed in this patent application are intended to diagnose effectively an abnormal operation of the system during regeneration process of a catalyst.

Means for Solving the Problem

According to the present invention, there is disclosed an exhaust purification system including:
a NOx redaction catalyst that is provided on an exhaust passageway of an internal combustion engine to reduce and purify NOx in an exhaust gas;
a catalyst regeneration means for executing a catalyst regeneration process of restoring a NOx purification capacity of the NOx reduction catalyst by switching an air-fuel ratio of the exhaust gas from a lean state to a rich state by using in parallel an air system control to reduce an intake air amount and an injection system control to increase a fuel injection amount;
an exhaust gas temperature sensor that is provided on a downstream side of the NOx reduction catalyst on the exhaust passageway;
a catalyst temperature estimating means for estimating a catalyst temperature of the NOx reduction catalyst based on an operating state of the internal combustion engine;
a temperature sensor value estimating means for estimating a sensor value of the exhaust gas temperature sensor based on the catalyst temperature that is inputted from the catalyst temperature estimating means; and
an abnormality determination means for determining on an abnormality of the catalyst regeneration process based on a difference in temperature between an actual sensor value of the exhaust gas temperature sensor and the estimated sensor value that is inputted from the temperature sensor value estimating means in the midst of execution of the catalyst regeneration process.

In addition, according to the present invention, there is provided an exhaust purification system including:
a NOx reduction catalyst that is disposed on an exhaust passageway of an internal combustion engine to reduce and purify NOx in an exhaust gas;
an exhaust gas temperature sensor that is provided on a downstream side of the NOx reduction catalyst on the exhaust passageway to detect a temperature of the exhaust gas as a first exhaust gas temperature; and
a control unit for controlling at least one of an intake air flow rate and a fuel injection amount of the internal combustion engine, wherein
the control unit operates so as to execute the following processes:
a regeneration process of restoring a NOx purification capacity of the NOx redaction catalyst by controlling at least one of the intake air flow rate and the fuel injection amount so as to make the exhaust gas rich;
an exhaust gas temperature estimating process of calculating a second exhaust gas temperature in which a temperature of the exhaust gas is estimated based on an operating state of the internal combustion engine; and
an abnormality detecting process of detecting an abnormality in the regeneration process based on the first exhaust gas temperature that is detected by the exhaust gas temperature sensor and the second exhaust gas temperature calculated by the exhaust gas temperature estimating process in the midst of execution of the regeneration process.

According to the present invention, there is provided a method for restoring a NOx purification capacity in an exhaust purification system having an internal combustion engine and a NOx reduction catalyst that is disposed on an exhaust passageway of the internal combustion engine to reduce and purify NOx in an exhaust gas, the method including:

a regeneration process of restoring the NOx purification capacity of the NOx reduction catalyst by controlling at least one of an intake air flow rate and a fuel injection amount of the internal combustion engine so as to make the exhaust gas rich;

a detection process of detecting a temperature of the exhaust gas as a first exhaust gas temperature;

an estimating process of calculating a second exhaust gas temperature in which a temperature of the exhaust gas is estimated based on an operating state of the internal combustion engine; and an abnormality detecting process of detecting an abnormality in the regeneration process based on the first exhaust temperature and the second exhaust temperature in the midst of execution of the regeneration process.

Advantageous Effect Of The Invention

According to the exhaust purification system and the method for restoring NOx purification capacity which are disclosed in this patent application, it is possible to diagnose effectively the abnormal operation of the system during regeneration process of the catalyst.

MODE FOR CARRYING OUT THE INVENTION

Hereinafter, an exhaust purification system according to an embodiment of the present invention will be described based or the accompanying drawings.

Figure 1:
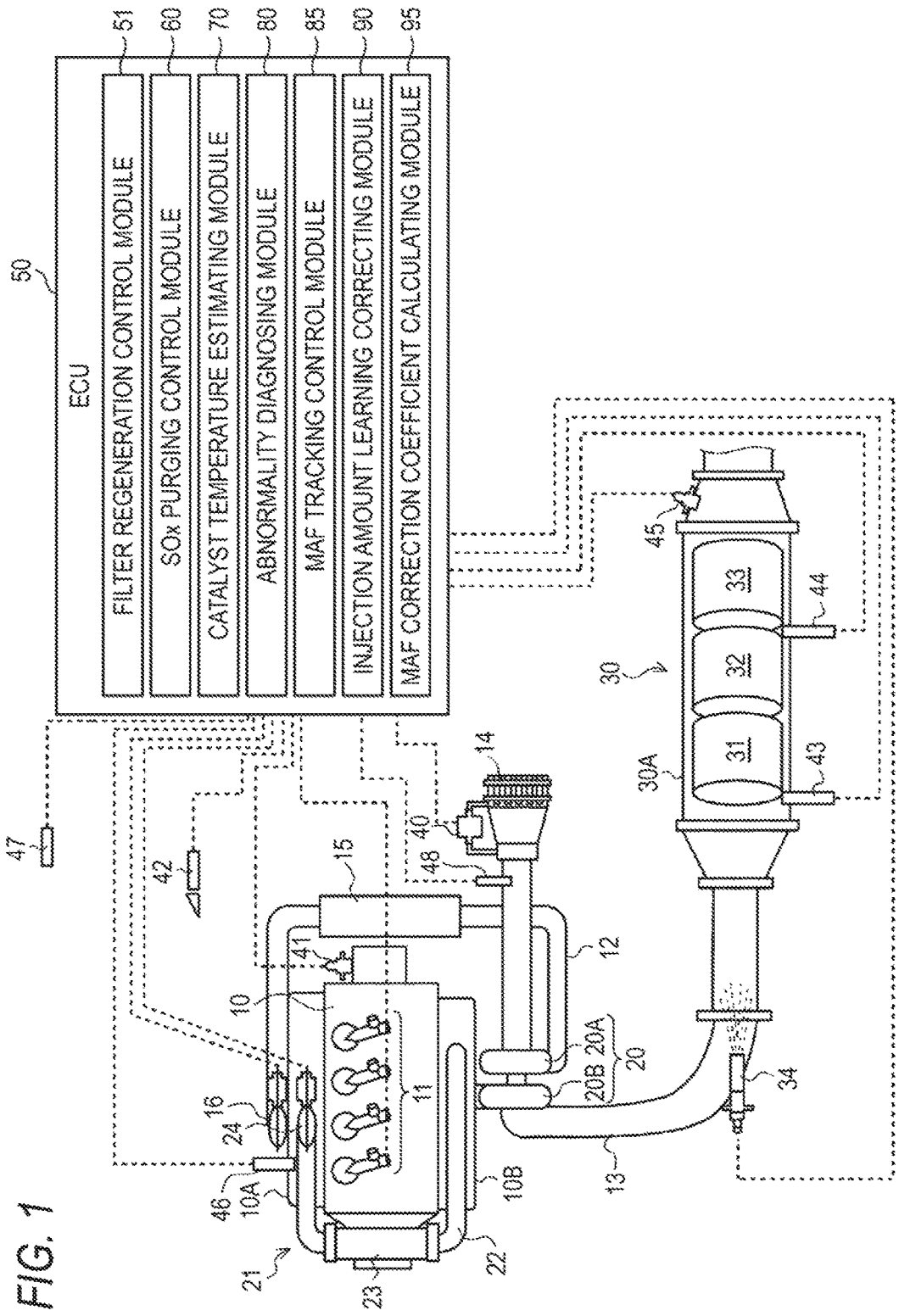
FIG. 1 is a schematic diagram illustrating an overall configuration of an exhaust purification system according to an embodiment of the present invention.

As shown in FIG. 1, direct injection injectors 11 are provided individually on cylinders of a diesel engine (hereinafter, referred to simply as an engine) 10 to inject high pressure fuel accumulated under pressure in a common rail, not shown, directly into the cylinders. A feel injection amount and a fuel injection timing for each of the direct injection injectors 11 are controlled by an instruction signal inputted from an electronic control unit (hereinafter, referred to as an ECU) 50.

An intake passageway 12 through which fresh air is introduced, is connected to an intake manifold 10A of the engine 10, and an exhaust passageway 13 through which exhaust gases are discharged to an exterior portion is connected to an exhaust manifold 10B. An air cleaner 14, an intake air amount sensor (hereinafter, referred to as MAF (Mass Air Flow) sensor) 40, an intake air temperature sensor 48, a compressor 20A of a variable capacity supercharger 20, an inter-cooler 15, an intake throttle valve 16 and the like are provided along the intake passageway 12 sequentially in that order from an upstream side of an intake air flow. A turbine 20B of the variable capacity supercharger 20 and an exhaust gas after-treatment apparatus 30 and the like are provided along the exhaust passageway 13 sequentially in that order from an upstream side of an exhaust gas flow. An engine revolution number sensor 41, an accelerator-opening sensor 42, a boost pressure sensor 46, and an outside air temperature sensor 47 are attached to the engine 10.

In the description of this embodiment, the MAF sensor 40 for measuring and detecting a mass flow rate (Mass Air Flow) is used as a sensor for measuring and detecting an engine intake air amount (intake air flow rate (Suction Air Flow)). However, a flow rate (Air Flow) sensor of a different type from the MAF sensor 40 or a means which replaces the air flow sensor may be used, provided that they can measure and detect an intake air flow rate.

An EGR device 21 includes an EGR passageway 22 which connects the exhaust manifold 10B and the intake manifold 10A, an EGR cooler 23 which cools EGR gas and an EGR valve 24 which controls an EGR amount.

The exhaust gas after-treatment apparatus 30 includes in a case 30A an oxidation catalyst 31, a NOx storage reduction catalyst 32, and a particulate filter (hereinafter, referred to simply as a filter) 33 sequentially in that order from an upstream side of an exhaust gas flow. In addition, an exhaust injector 34 for injecting unburned fuel (mainly hydrocarbon (HC)) into the exhaust passageway 13 according to an instruction signal inputted from the ECU 50 is provided on a portion of the exhaust passageway 13 which is situated upstream of the oxidation catalyst 31.

It should be noted that the exhaust injector 34 is also referred to as an in-exhaust-pipe injector or simply as an injector.

The oxidation catalyst 31 is formed by causing an oxidation catalyst component to be carried on a surface of a ceramic carrier of a honeycomb structure. When supplied with unburned fuel through a post injection by the exhaust injector 34 or the direct injection injectors 11, the oxidation catalyst 31 oxidizes the unburned fuel to increase the temperature of exhaust gases.

The NOx storage reduction catalyst 32 is formed by placing an alkaline metal over a surface of a ceramic carrier of a honeycomb structure. This NOx storage reduction catalyst 32 adsorbs NOx in exhaust gas when the air-fuel ratio of the exhaust gas is in the lean state, whereas when the air-fuel ratio of the exhaust gas is in the rich state, the NOx storage reduction catalyst 32 reduces and purifies the adsorbed NOx with a reducing agent (HC) contained in the exhaust gas.

The filter 33 is formed by disposing a number of cells which are defined by porous bulkheads along a flowing direction of exhaust gases and sealing upstream ends and downstream ends of the cells in an alternate fashion. The filter 33 traps particulate matters (PM) in exhaust gases in fine holes and on surfaces of the bulkheads and executes a so-called forced filter regeneration in which the trapped PM are burned to be removed when an estimated amount of accumulation of trapped PM reaches a predetermined amount. The forced filter regeneration is executed by supplying unburned fuel to the oxidation catalyst 31, which is disposed at an upstream side, through the exhaust pipe injection or the post-injection and raising the temperature of the exhaust gas flowing into the filter 33 up to a PM combustion temperature.

A first exhaust gas temperature sensor 43 is provided upstream of the oxidation catalyst 31 and detects a temperature of exhaust gas that flows into the oxidation catalyst 31. A second exhaust gas temperature sensor 44 is provided between the NOx storage reduction catalyst 32 and the filter 33 and detects a temperature of exhaust gas that is discharged from the NOx storage reduction catalyst 32. A NOx/lambda sensor 45 is provided downstream of the filter 33 and detects a NOx value and a lambda value (hereinafter, referred also to as an excess air factor) of exhaust gas which passes the NOx storage reduction catalyst 32

The ECU 50 performs various controls of the engine 10 and the like and is made up of a known CPU, ROM, RAM, input port and output port. To enable the ECU 50 to perform the various controls, sensor values are inputted into the ECO 50 from the sensors 40 to 48. The ECU 50 has a filter regeneration control module 51, a SOx purging control module 60, a catalyst temperature estimating module 70, an abnormality diagnosing module 80, a MAF tracking control module 85, an injection amount learning correcting module 90, and a MAF correction coefficient calculating module 95 as part of its functional elements. These functional elements are described as being incorporated in the ECU 50, which is integrated hardware. However, some of the functional elements can also be provided on separate hardware.

[Filter Regeneration Control]

The filter regeneration control module 51 estimates a PM accumulation amount in the filter 33 from a mileage of the vehicle or a differential pressure between a front and rear of the filter that is detected by a differential pressure sensor, not shown, and sets on a forced regeneration flag $F_{DPF}$ (refer to a time $t_1$ in FIG. 2) when the estimated PM accumulation amount exceeds a predetermined upper limit threshold. When the forced regeneration flag $F_{DPF}$ is set on, an instruction signal that instructs the exhaust injector 34 to execute an exhaust pipe injection is sent or an instruction signal that instructs each of the direct injection injectors 11 to execute a post injection is sent, so that the temperature of exhaust gas is raised to the PM combustion temperature (for example, about 550° C.). This forced regeneration flag $F_{DPF}$ is set off (refer to a time $t_2$ in FIG. 2) when the estimated PM accumulation amount is lowered to a predetermined lower limit threshold (a determination threshold) which indicates that the accumulated PM are burned and removed. The determination threshold that sets off the forced regeneration flag may be based on an upper limit elapsing time or an upper limit accumulated injection amount from a start of a forced filer regeneration ($F_{DPF}$=1).

In this embodiment, a fuel injection amount when a forced filter regeneration is performed is designed to be feedback controlled based on either an oxidation catalyst temperature or a NOx catalyst temperature that is specified as required by a reference temperature selecting module 79 (refer to FIG. 6), which will be described in detail later.

[SOx Purging Control]

The SOx purging control module 60 executes a control (hereinafter, this control will be referred to as a SOx purging control) to restore the NOx storage reduction catalyst 32 from the SOx poisoning by enriching exhaust gas in a rich state to raise the temperature of the exhaust gas to a sulfur desorption temperature (for example, about 600° C.).

Figure 2:
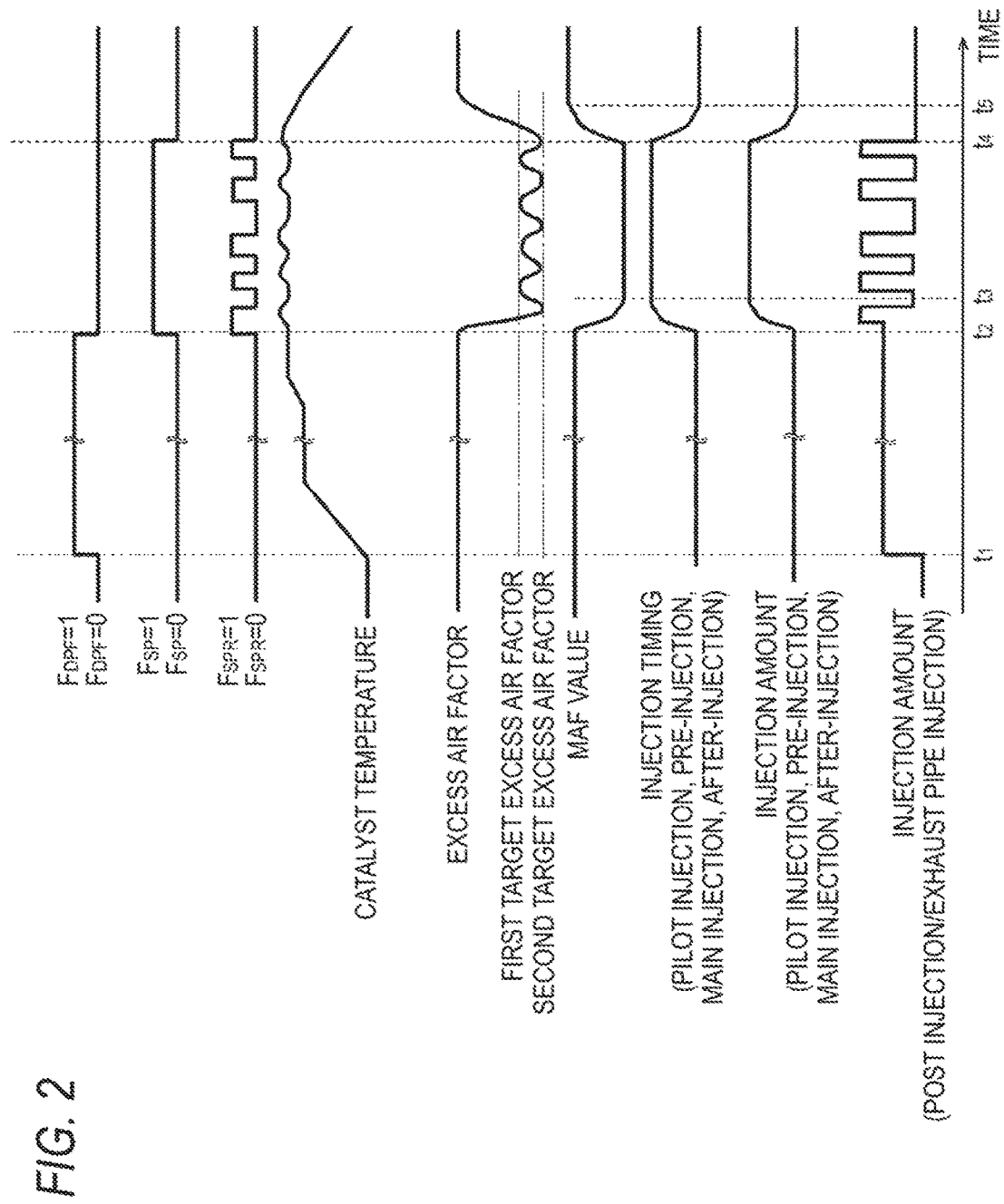
FIG. 2 is a timing chart illustrating a SOx purging control according to the embodiment.

FIG. 2 shows a timing chart of a SOx purging control according to the embodiment. As shown in FIG. 2, a SOx purging flag $F_{SP}$ that initiates a SOx purging control is set on at the same time that the forced regeneration flag $F_{DPF}$ is set off (refer to the time $t_2$ in FIG. 2). By doing so, the state where the temperature of the exhaust gas is raised by the forced regeneration of the filter 33 can efficiently be shifted to the SOx purging control, thereby making it possible to reduce effectively an amount of consumption of fuel.

In this embodiment, the enrichment of exhaust gas by executing the SOx purging control is realized by executing both a SOx purging lean control in which the excess air factor is lowered from an excess air factor during the steady state running (about 1.5) to a first target excess air factor (for example, about 1.3) which is leaner than an excess air factor (about 1.0) corresponding to the stoichiometric air-fuel ratio by controlling the air system and a SOx purging rich control in which the excess air factor is lowered from the first target excess air factor to a second target excess air factor (for example, about 0.9) which stands on the rich side by controlling the injection system. Hereinafter, the SOx purging lean control and the SOx purging rich control will be described in detail

[Air System Control for SOx Purging Lean Control]

Figure 3:
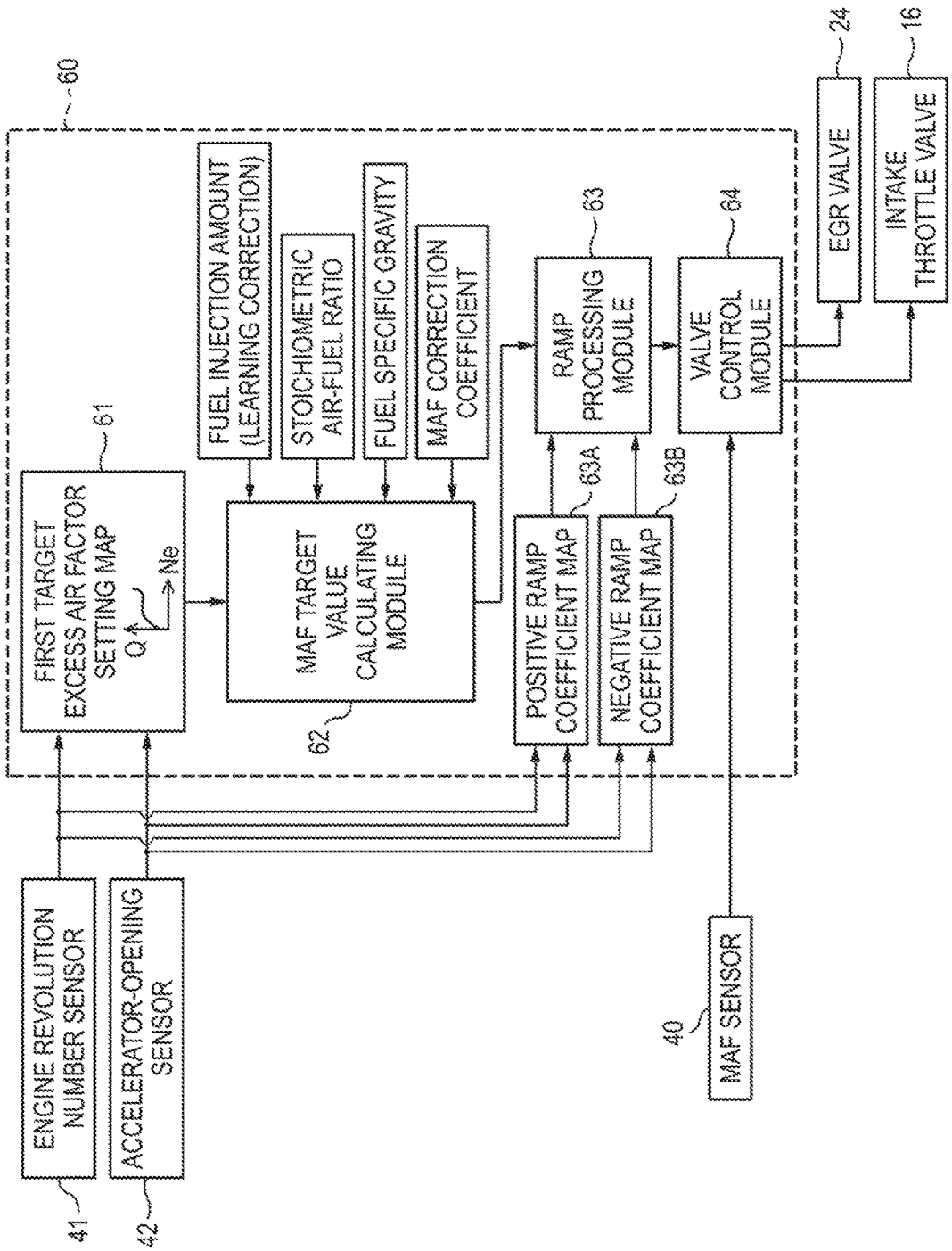
FIG. 3 is a block diagram illustrating a setting process of a MAF target value in executing a SOx purging lean control according to the embodiment.

FIG. 3 is a block diagram illustrating a MAF target value $MAF_{SPL\_Trgt}$ setting process in executing the SOx purging lean control. A first target excess air factor setting map 61 is a map that is referred to based on an engine revolution number Ne and an accelerator-opening Q (an amount of injection of fuel in the engine 10), and excess air factor target values $\lambda_{SPL\_Trgt}$ (the first target excess air factor) corresponding to engine revolution number Ne and accelerator-opening Q during the SOx purging lean control are set based on experiments in advance in the map.

Firstly, an excess air factor target value $\lambda_{SPL\_Trgt}$ value during the SOx purging lean control is read from the first target excess air factor setting map 61 based on an engine revolution number Ne and an accelerator-opening Q, as input signals, and is then inputted into a MAF target value calculating module 62. Further, in the MAF target value calculating module 62, a MAF target value $MAF_{SPL\_Trgt}$ during the SOx purging lean control is calculated based on the following expression (1).

[Expression 1]

$$MAF_{SPL\_Trgt} = \frac{\lambda_{SPL\_Trgt} \times Q_{fnl\_corrd} \times Ro_{Fuel} \times AFR_{sto}}{Maf_{corr}} \quad (1)$$

In the expression (1), $Q_{fnl\_corrd}$ denotes a fuel injection amount (excluding the post infection), which will be described later, on which a learning correction has been performed, $Ro_{Fuel}$ denotes a fuel specific gravity, $AFR_{sto}$ denotes the stoichiometric air-fuel ratio, and $Maf\_corr$ denotes a MAF correction coefficient, which will be described later.

The MAF target value $MAF_{SPL\_Trgt}$ that is calculated by the MAF target value calculating module 62 is inputted into a ramp processing module 63 when the SOx purging flag $F_{SP}$ is set on (refer to the time $t_2$ in FIG. 2). The ramp processing module 63 reads a ramp coefficient from a positive ramp coefficient map 63A and a negative ramp coefficient map 63B based on an engine revolution number Ne and an accelerator-opening Q, as input signals, and inputs a MAF target ramp value $MAF_{SPL\_Trgt\_Ramp}$ to which the ramp coefficient so read is added to a valve control module 64.

A valve control module 64 executes a feedback control in which the intake throttle valve 16 is controlled to be closed while the EGR valve 24 is controlled to be opened so that an actual MAP value $MAF_{Act}$ inputted from the MAF sensor 40 becomes the MAF target ramp value $MAF_{SPL\_Trgt\_Ramp}$.

In this way, in this embodiment, the MAF target value $MAF_{SPL\_Trgt}$ is set based on the excess air factor target value $\lambda_{SPL\_Trgt}$ that is read from the first target excess air factor setting map 61 and the fuel injection amounts of each of the direct injection injectors 11, and the operation of the air system is feedback controlled based on the MAF target value $MAF_{SPL\_Trgt}$. By doing so, the exhaust gas can be reduced effectively to a desired excess air factor that is necessary for the SOx purging lean control without providing a lambda sensor upstream of the NOx storage reduction catalyst 32 or without using a sensor value of the lambda sensor even when the lambda sensor is provided, upstream of the NOx storage reduction catalyst 32.

Additionally, the MAF target value $MAF_{SPL\_Trgt}$ can be set through a feedforward control by using the fuel injection amount $Q_{fnl\_corrd}$ on which a learning correction has been performed as the fuel injection amounts of each of the direct injection injectors 11, thereby making it possible to eliminate effectively the influence resulting from the deterioration with age or property variation of each of the direct injection injectors 11 or the individual difference thereof.

In addition, the deterioration in drivability that would be caused by a misfire or torque variation of the engine 10 resulting from a dramatic change in the amount of intake air can be prevented effectively by adding a ramp factor that is set according to the running condition of the engine 10 to the MAF target value $MAF_{SPL\_Trgt}$.

[Fuel Injection Amount Setting for SOx Purging Rich Control]

Figure 4:
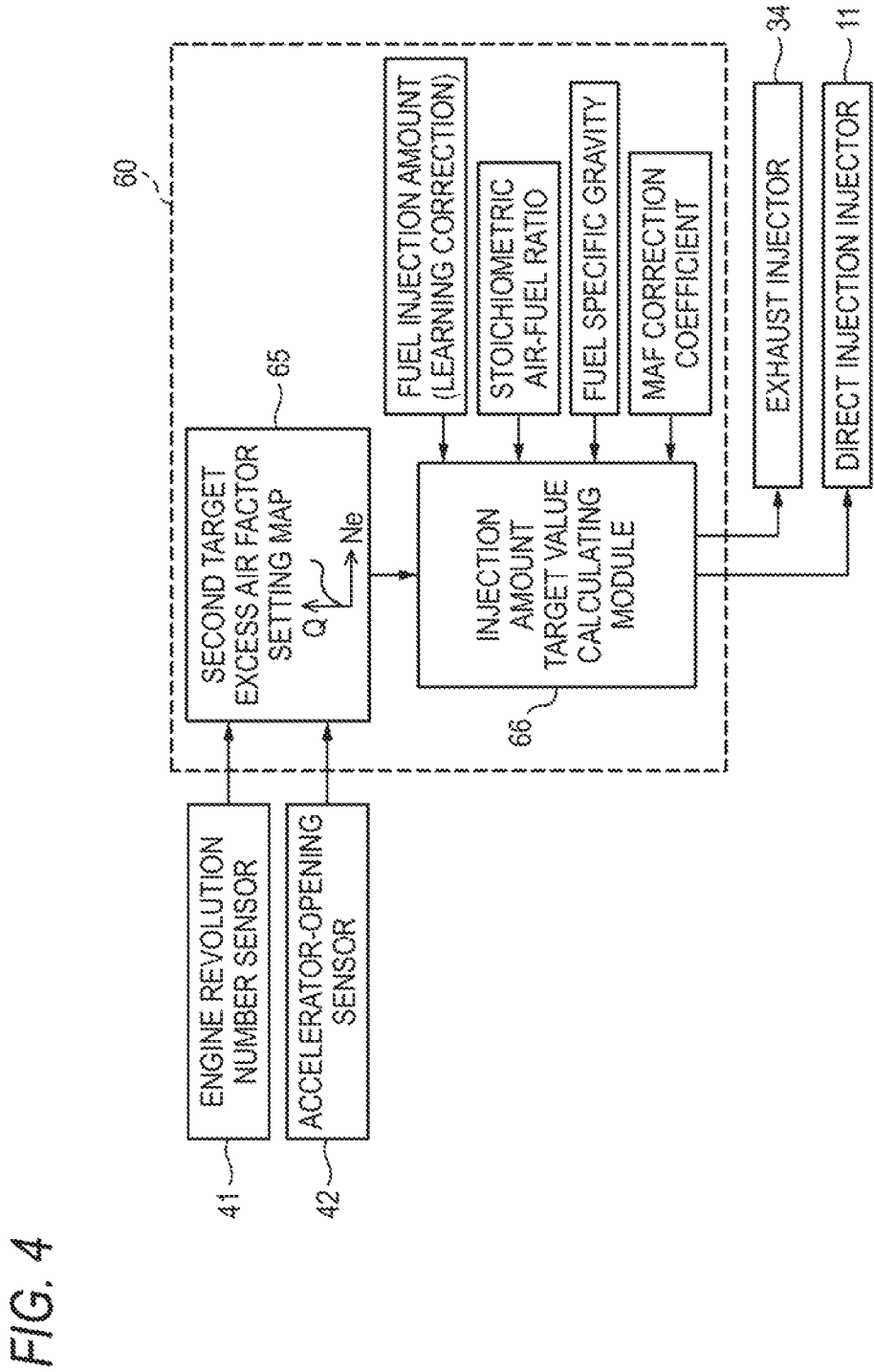
FIG. 4 is a block diagram illustrating a setting process of a target injection amount in executing a SOx purging rich control according to the embodiment.

FIG. 4 is a block diagram showing a setting process of a target injection amount $Q_{SPR\_Trgt}$ (an injection amount per unit time) for an exhaust pipe injection or a post injection in the SOx purging rich control. A second target excess air factor setting map 65 is a map that is referred to based on an engine revolution number Ne and an accelerator-opening Q, and excess air factor target values $\lambda_{SPR\_Trgt}$ (the second target excess air factor) corresponding to engine revolution number Ne and accelerator-opening Q during a SOx purging rich control are set based on experiments in advance in the map.

Firstly, an excess air factor target value $\lambda_{SPR\_Trgt}$ value during the SOx purging rich control is read from, the second target excess air factor setting map 65 based on an engine revolution number Ne and an accelerator-opening Q, as input signals, and is then inputted into an injection amount target value calculating module 66. Further, in the injection amount target value calculating module 66, a target injection value $Q_{SPR\_Trgt}$ during the SOx purging rich control is calculated based on the following expression (2).

[Expression 2]

$$Q_{SPL\_Trgt} = \frac{MAF_{SPL\_Trgt} \times Maf_{corr}}{\lambda_{SPR\_Trgt} \times Ro_{Fuel} \times AFR_{sto}} - Q_{fnl\_corrd} \quad (2)$$

In the expression (2), $MAF_{SPL\_Trgt}$ denotes a MAF target value during the SOx purging lean control, and is inputted from the MAF target value calculating module 62. In addition, $Q_{fnl\_corrd}$ denotes a fuel injection amount (excluding the post injection), which will be described later, on which a learning correction has been performed and to which a MAF tracking control has not yet been applied, $Ro_{Fuel}$ denotes a fuel specific gravity, $AFR_{sto}$ denotes the stoichiometric air-fuel ratio, and $Maf\_corr$ denotes a MAF correction coefficient, which will be described later.

The target injection amount $Q_{SPR\_Trgt}$ calculated by the injection amount target value calculating module 66 is transmitted to the exhaust injector 34 or each of the direction injection injectors 11 as an injection Instruction signal when a SOx purging rich flag $F_{SPR}$, which will be described later, is on.

In this way, in this embodiment, the target injection amount $Q_{SPR\_Trgt}$ is set based on the excess air factor target value $\lambda_{SPR\_Trgt}$ that is read from the second target excess air factor setting map 65 and the fuel injection amounts of each of the direct injection injectors 11. By doing so, the exhaust gas can be reduced effectively to a desired excess air factor that is necessary for the SOx purging rich control without providing a lambda sensor upstream of the NOx storage reduction catalyst 32 or without using a sensor value of the lambda sensor even when the lambda sensor is provided upstream of the NOx storage reduction catalyst 32.

Additionally, the target injection amount $Q_{SPR\_Trgt}$ can be set through a feedforward control by using the fuel injection amount $Q_{fnl\_corrd}$ on which a learning correction has been performed as the fuel injection amounts of each of the direct injection injectors 11, thereby making it possible to eliminate effectively the influence resulting from the deterioration with age or property variation of each of the direct injection injectors 11.

[Catalyst Temperature Adjusting Control for SOx Purging Control]

The temperature of exhaust gas that is discharged from the NOx storage reduction catalyst 32 (hereinafter, referred also to as a catalyst temperature) during the SOx purging control is controlled by switching a SOx purging rich flag $F_{SPR}$ that executes the exhaust pipe injection or the post injection between on and off (rich and lean) alternately, as shown at times $t_2$ to $t_4$ in FIG. 2. When the SOx purging rich flag $F_{SPR}$ is set on ($F_{SPR}=1$), the catalyst temperature is raised by the exhaust pipe injection or the post injection (hereinafter, this period will be referred to as an injection period $T_{F\_INJ}$). On the other hand, when the SOx purging rich flag $F_{SPR}$ is set off, the exhaust pipe injection or the post injection is stopped, whereby the catalyst temperature is lowered (hereinafter, this period will be referred to as an interval $T_{F\_INF}$).

In this embodiment, the injection period $T_{F\_INJ}$ is set by reading a value corresponding to an engine revolution number Ne and an accelerator-opening Q from an injection period setting map (not shown) that is prepared in advance through experiments. Injection periods, which is set in the injection period setting map, obtained in advance through experiments that are necessary to lower the excess air factor of exhaust gas to the second target excess air factor are set so as to correspond to operating states of the engine 10.

The interval $T_{F\_INT}$ is set through a feedback control when the SOx purging rich flag $F_{SPR}$ is switched from on to off where the catalyst temperature becomes the highest. Specifically, the interval $T_{F\_INT}$ is set through a PID (Proportional-Integral-Derivative) control that is made up of a proportional control in which an input signal is changed in proportion to a deviation $\Delta T$ between a target catalyst temperature and an estimated catalyst temperature when the SOx purging rich flag $F_{SPR}$ is off, an integral control in which an input signal is changed in proportion to a time integral value of the deviation $\Delta T$ and a derivative control in which an input signal is changed in proportion to a time differentiating value of the deviation $\Delta T$. The target catalyst temperature is set to be the SOx desorption temperature at which SOx can be desorbed from the NOx storage reduction catalyst 32, and the estimated catalyst temperature is set to be either the oxidation catalyst temperature or the NOx catalyst temperature that is specified by the reference temperature selecting module 79 (refer to FIG. 6), which will be described in detail later.

Figure 5:
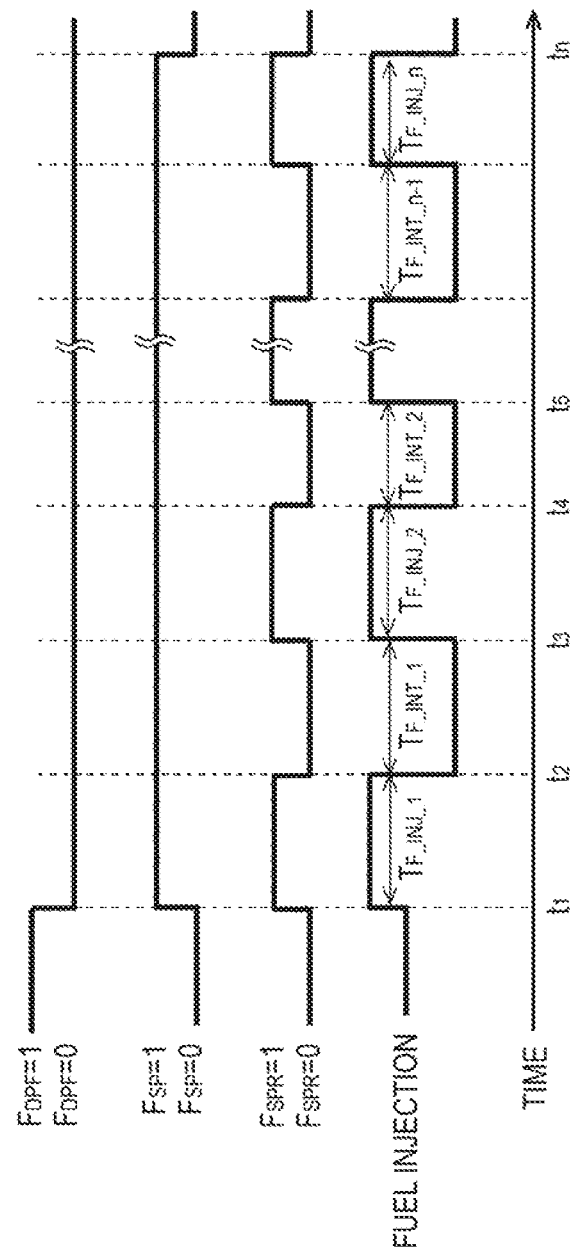
FIG. 5 is a timing chart illustrating a catalyst temperature adjusting control in the SOx purging control according to the embodiment.

As shown at a time $t_1$ in FIG. 5, when the SOx purging flag $F_{SP}$ is set on as a result of the end of the forced filter regeneration ($F_{DPF}$=0), the SOx purging rich flag $F_{SPR}$ is also set on, and further, the interval $T_{F\_INT}$ that was feedback calculated during the previous SOx purging control is also reset temporarily. Namely, in an initial period immediately after the forced filter regeneration, the exhaust pipe injection or the post injection is executed according to an injection period $T_{F\_INJ\_1}$ which is set from the injection period setting map (refer to a time period from a time $t_1$ to a time $t_2$ in FIG. 5). In this way, since the SOx purging control is started from the SOx purging rich control without performing the SOx purging lean control, it is possible to shift quickly to the SOx purging control without the exhaust gas temperature that is raised during the forced filter regeneration being lowered, thereby making it possible to reduce the amount of consumption of fuel.

Next, when the SOx purging rich flag $F_{SPR}$ is set off after the injection period $T_{F\_INJ\_1}$ has elapsed, the SOx purging rich flag $F_{SPR}$ is kept off until the interval $T_{F\_INT\_1}$ that is set through the PID control elapses (refer to a time period from the time $t_2$ to a time $t_3$ in FIG. 5). Further, when the SOx purging rich flag $F_{SPR}$ is set on after the interval $T_{F\_INT\_1}$ has elapsed, an exhaust pipe injection or a post injection corresponding to an Injection period $T_{F\_INJ\_2}$ executed again (refer to a time period from the time $t_3$ to a time $t_4$ in FIG. 5). Thereafter, the switching of the SOx purging rich flag $F_{SPR}$ between on and off is executed repeatedly until the SOx puling flag $F_{SP}$ is set off as a result of a determination being made that the SOx purging control ends (refer to a time $t_n$ in FIG. 5).

In this way, in this embodiment, the injection period $T_{F\_INJ}$ during which the catalyst temperature is raised and the excess air factor is lowered to the second target excess air factor is set from the map that is referred to based on the operating state of the engine 10, and the interval $T_{F\_INT}$ during which the catalyst temperature is lowered is processed through the PID control. By doing so, the excess air factor can be lowered to the target excess air factor in an ensured fashion while holding effectively the catalyst temperature during the SOx purging control within the desired temperature range that is necessary for purging.

[Catalyst Temperature Estimation]

Figure 6:
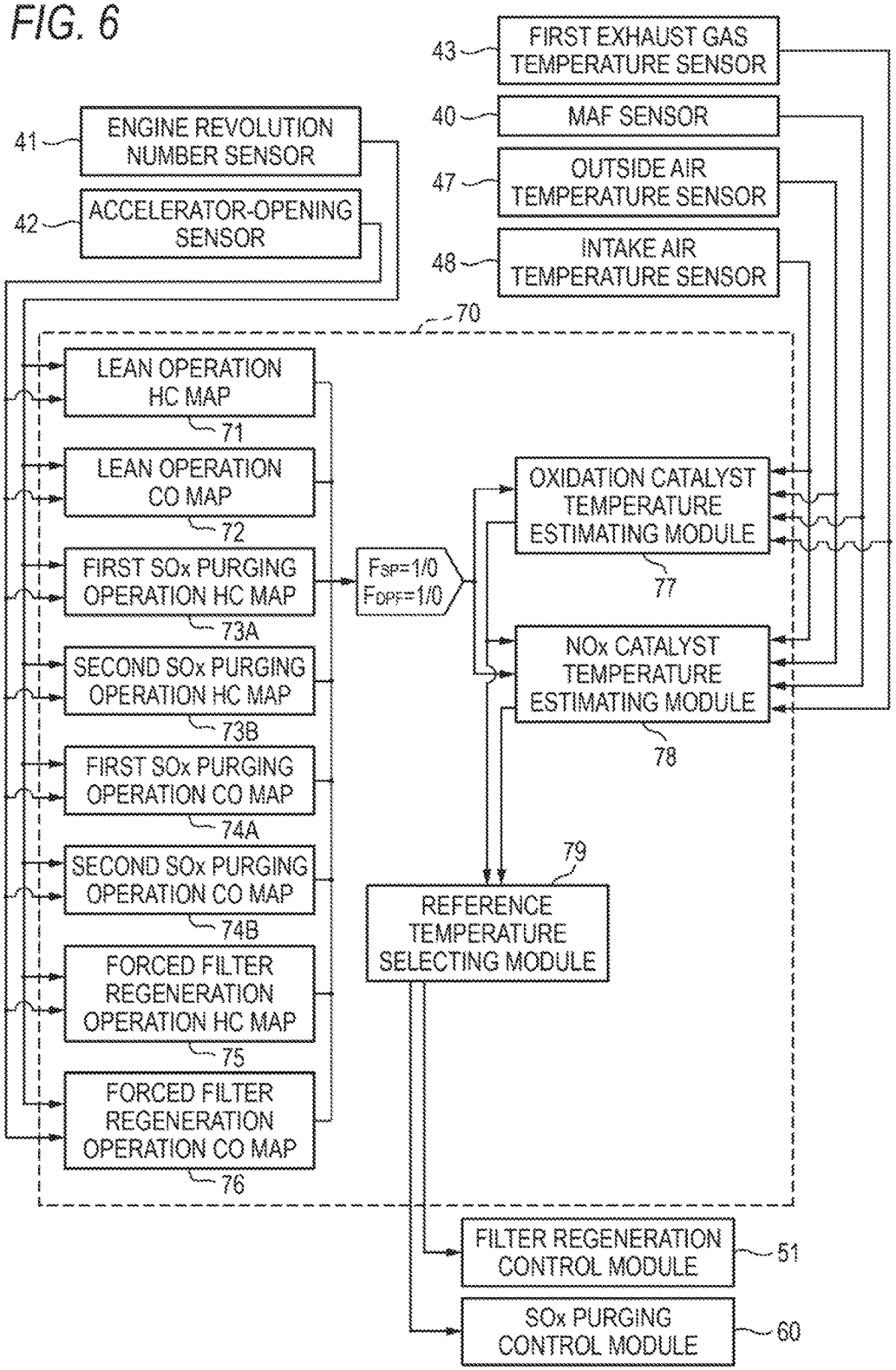
FIG. 6 is a block diagram illustrating an estimating process of catalyst temperature according to the embodiment.

FIG. 6 is a block diagram showing a process of estimating an oxidation catalyst temperature and a NOx catalyst temperature by use of the catalyst temperature estimating module 70.

A lean operation HC map 71 is a map that is referred to based on the operating state of the engine 10, and amounts of HC discharged from the engine 10 when the engine 10 operates in a lean state (hereinafter, referred to as lean-operation HC discharge amounts) are set in advance in the map through experiments. In the event that the SOx purging flag $F_{SP}$ and the forced regeneration flag $F_{DPF}$ are off ($F_{SP}$=0, $F_{DPF}$=0), a lean-operation HC discharge amount that is read from the lean operation HC map 71 based on an engine revolution number Ne and an accelerator-opening Q is multiplied by a predetermined coefficient corresponding to a sensor value of the MAF sensor 40, and the resulting value is transmitted to an oxidation catalyst temperature estimating module 77 and a NOx catalyst temperature estimating module 78.

A lean operation CO map 72 is a map that is referred to based on the operating state of the engine 10, and amounts of CO discharged from the engine 10 when the engine 10 operates in a lean state (hereinafter, referred to as lean-operation CO discharge amounts) are set in advance in the map through experiments. In the event that the SOx purging flag $F_{SP}$ and the forced regeneration flag $F_{DPF}$ are off ($F_{SP}$=0, $F_{DPF}$=0), a lean-operation CO discharge amount that is read from the lean operation CO map 72 based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A first SOx purging operation HC map 73A is a map that is referred to based on the operating state of the engine 10, and amounts of HC discharged from the engine 10 when the SOx purging control is executed in such a state that an injection pattern of the direct injection injectors 11 includes an after injection (hereinafter, referred to as first SOx purging control operation HC discharge amounts) are set in advance in the map through experiments. In the event that the SOx purging flag $F_{SP}$ is on ($F_{SP}$=1) and the injection pattern of the direct injection injectors 11 includes the after injection, a first SOx purging control operation HC discharge amount that is read from the first SOx purging operation HC map 73A based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A second SOx purging operation HC map 73B is a map that is referred to based on the operating state of the engine 10, and amounts of HC discharged from the engine 10 when the SOx purging control is executed in such a state that an injection pattern of the direct injection injectors 11 includes no after injection (hereinafter, referred to as second SOx purging control operation HC discharge amounts) are set in advance in the map through experiments. In the event that the SOx purging flag $F_{SP}$ is on ($F_{SP}$=1) and the injection pattern of the direct injection injectors 11 includes no after injection, a second SOx purging control operation HC discharge amount that is read from the second SOx purging operation HC map 73B based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A first SOx purging operation CO map 74A is a map that is referred to based on the operating state of the engine 10, and amounts of CO discharged from the engine 10 when the SOx purging control is executed in such a state that an injection pattern of the direct injection injectors 11 includes an after injection (hereinafter, referred to as first SOx purging control operation CO discharge amounts) are set in advance in the map through experiments. In the event that the SOx purging flag $F_{SP}$ is on ($F_{SP}$=1) and the injection pattern of the direct injection injectors 11 includes the after injection, a first SOx purging control operation CO discharge amount that is read from the first SOx purging operation CO map 74A based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A second SOx purging operation CO map 74B is a map that is referred to based on the operating state of the engine 10, and amounts of CO discharged from the engine 10 when the SOx purging control is executed in such a state that an injection pattern of the direct injection injectors 11 includes no after injection (hereinafter, referred to as second SOx purging control operation CO discharge amounts) are set in advance in the map through experiments. In the event that the SOx purging flag $F_{SP}$ is on ($F_{SP}$=1) and the injection pattern of the direct injection injectors 11 includes no after injection, a second SOx purging control operation CO discharge amount that is read from the second SOx purging operation CO map 74B based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A forced filter regeneration operation HC map 75 is a map that is referred to based on the operating state of the engine 10, and amounts of HC discharged from the engine 10 when a forced filter regeneration is executed (hereinafter, referred to as filter regeneration operation HC discharge amounts) are set in advance in the map through experiments. In the event that the forced regeneration flag $F_{DPF}$ is on ($F_{DPF}$=1), a filter regeneration operation HC discharge amount read from the forced filter regeneration operation HC map 75 based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

A forced filter regeneration operation CO map 76 is a map that is referred to based on the operating state of the engine 10, and amounts of CO discharged from the engine 10 when a forced filter regeneration is executed (hereinafter, referred to as filter regeneration operation CO discharge amounts) are set in advance in the map through experiments. In the event that the forced regeneration flag $F_{DPF}$ is on ($F_{DPF}$=1), a filter regeneration operation CO discharge amount read from the forced filter regeneration operation CO map 76 based on an engine revolution number Ne and an accelerator-opening Q is multiplied by a predetermined coefficient corresponding to a sensor value of the MAF sensor 40, and the resulting value is transmitted to the oxidation catalyst temperature estimating module 77 and the NOx catalyst temperature estimating module 78.

The oxidation catalyst temperature estimating module 77 estimates and calculates a catalyst temperature of the oxidation catalyst 31 based on a model formula or map that includes, as input values, an oxidation catalyst inlet temperature that is detected by the first exhaust gas temperature sensor 43, heat values of HC and CO in the interior of the oxidation catalyst 31, a sensor value of the MAF sensor 40, and an amount of heat dissipated to outside air that is estimated from a sensor value of the outside air temperature sensor 47 or the intake air temperature sensor 48.

Heat values of HC and CO in the interior of the oxidation catalyst 31 are calculated based on a model formula or map that includes, as input values, discharge amounts of HC and CO that are inputted thereinto from each of the maps 71 to 76 as the SOx purging flag $F_{SP}$ or the forced regeneration flag $F_{DPF}$ are switched on and off. The calculated heat values of HC and CO are multiplied by a deterioration correction coefficient $D\_{corr}$ that is inputted from a deterioration correction coefficient calculating module 83 (refer to FIG. 7), which will be described in detail later.

The NOx catalyst temperature estimating module 78 estimates and calculates a catalyst temperature of the NOx storage reduction catalyst 32 based on a model formula or map that includes, as input values, an oxidation catalyst temperature that is inputted from the oxidation catalyst temperature estimating module 77, heat values of HC and CO in the interior of the NOx storage reduction catalyst 32, and an amount of heat dissipated to outside air that is estimated from a sensor value of the outside air temperature sensor 47 or the intake air temperature sensor 48.

Heat values of HC and CO in the interior of the NOx storage reduction catalyst 32 are calculated based on a model formula or map that includes, as input values, discharge amounts of HC and CO that are inputted thereinto from each of the maps 71 to 76 as the SOx purging flag $F_{SP}$ or the forced regeneration flag $F_{DPF}$ are switched on and off. The calculated heat values of HC and CO are multiplied by a deterioration correction coefficient $D\_{corr}$ that is inputted from a deterioration correction coefficient calculating module 83 (refer to FIG. 7), which will be described in detail later.

In this way, in this embodiment, the heat values of HC and CO in the interiors of the catalysts can be calculated accurately by switching the various types of maps 71 to 76 as required according to the situations where the operation is in a lean state, the SOx purging and the forced filter regeneration are executed, thereby making it possible to improve effectively the accuracy with which the temperatures of each of the catalysts 31, 32 are estimated.

[FB Control Reference Temperature Selection]

A reference temperature selecting module 79 shown in FIG. 6 specifies a reference temperature for use in performing the temperature feedback control for the forced filter regeneration and the SOx purging that have been described heretofore.

In the exhaust purification system including the oxidation catalyst 31 and the NOx storage reduction catalyst 32, the heat values of HC and CO in the catalysts 31, 32 differ according to the heat generating properties of each of the catalysts 31, 32. Because of this, it is preferable to select the catalyst temperature of the catalyst having the greater heat values of HC and CO as a reference temperature for use in the temperature feedback control in improving the controllability.

The reference temperature selecting module 79 specifies one of the oxidation catalyst temperature and the NOx catalyst temperature that exhibits a greater heat value estimated from an operating state of the engine 10 then and transmits the catalyst temperature specified to the filter regeneration control module 51 and the SOx purging control module 60 as a reference temperature for the temperature feedback control. To be more specific, an oxidation catalyst temperature inputted from the oxidation catalyst temperature estimating module 77 is selected as a reference temperature for the temperature feedback control when the forced filter regeneration is performed during which the oxygen concentration in exhaust gas is relatively high and the heat values of HC and CO in the oxidation catalyst 31 are increased, whereas when the SOx purging rich control is performed during which the heat values of HC and CO in the NOx storage reduction catalyst 32 are increased by a reduction in oxygen concentration in exhaust gas, a NOx catalyst temperature inputted torn the NOx catalyst temperature estimating module 78 is selected as a reference temperature for the temperature feedback control.

In this way, in this embodiment, the catalyst temperature exhibiting the greater heat values of HC and CO is selected as the reference temperature for the temperature feedback control, thereby making it possible to improve the controllability effectively.

[Abnormality Diagnosing]

Figure 7:
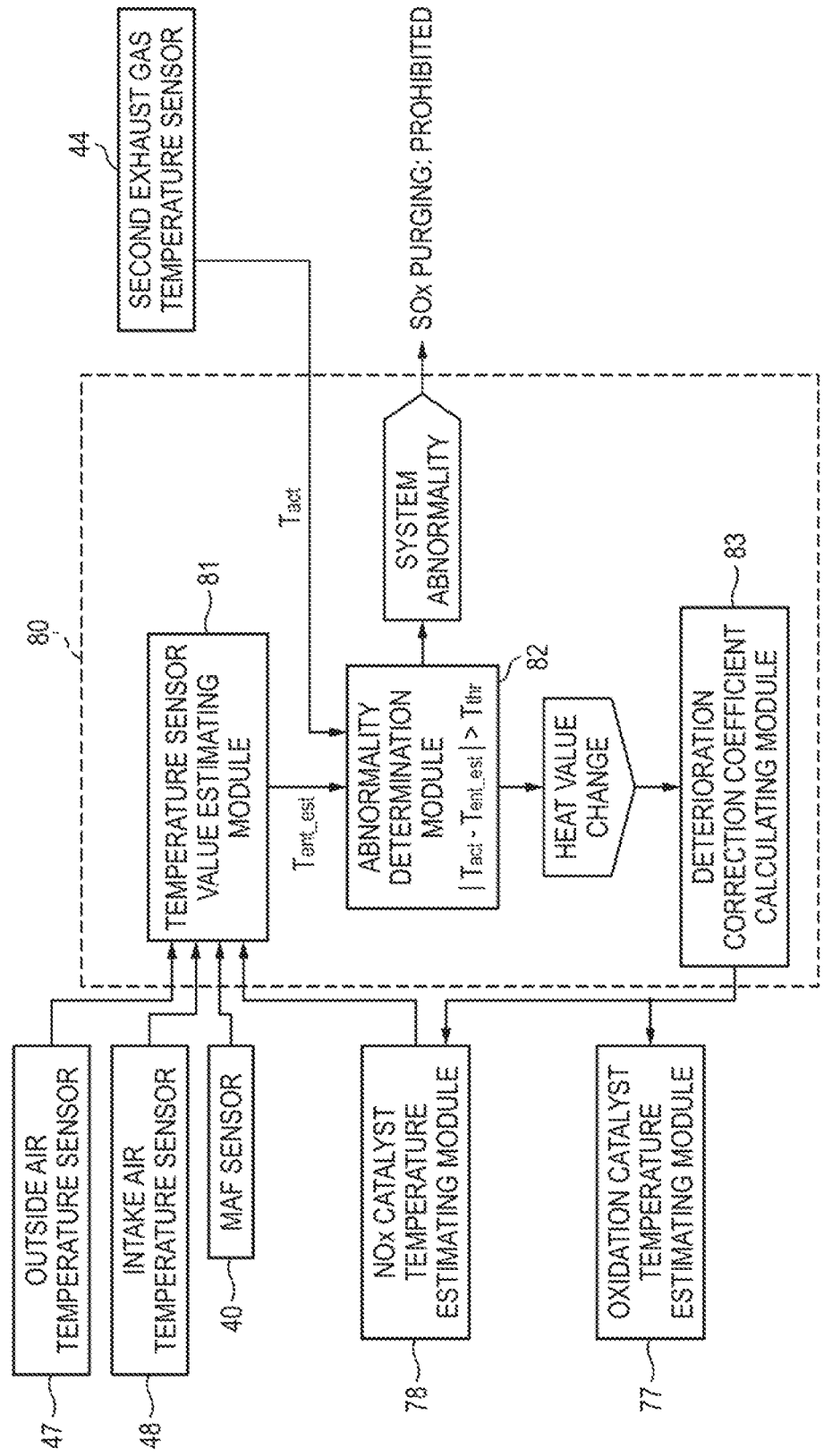
FIG. 7 is a block diagram illustrating a diagnosing process according to the embodiment.

FIG. 7 is a block diagram showing a diagnosing process that is performed by the abnormality diagnosing module 80.

A temperature sensor value estimating module 81 calculates an estimated sensor value $T_{ent\_est}$ of the second exhaust gas temperature sensor 44 in a real time fashion based on the NOx catalyst temperature inputted torn the NOx catalyst temperature estimating module 78. To be more specific, an estimated sensor value $T_{est\_est}$ is calculated by estimating an exhaust gas temperature around a sensor portion of the second exhaust gas temperature sensor 44 based on a model formula that includes, as input values, the NOx catalyst temperature, the sensor value of the MAF sensor 40, the heat values of each of the catalysts 31, 32, and the amount of heat dissipated to the outside air and multiplying the exhaust gas temperature around the sensor portion by a predetermined filter coefficient.

An abnormality determination module 82 determines whether or not a system abnormality is occurring based on the estimated sensor value $T_{ent\_est}$ inputted from the temperature sensor value estimating module 81 and the actual sensor value $T_{act}$ of the second exhaust gas temperature sensor 44. To be more specific, when a state where an absolute value of a difference between the actual sensor value $T_{act}$ and the estimated sensor value $T_{ent\_est}$ becomes greater than an upper limit threshold $T_{thr}$ ($|T_{act}-T_{ent\_est}|>T_{thr}$) continues for a predetermined period of time or longer, the abnormality determination module 82 determines that a system abnormality is occurring which is triggered by the failure of the exhaust injector 34 or the direction injection injector or injectors 11, the failure of each of the catalysts 31, 32 or control failure. When the abnormality determination module 82 determines that a system failure is occurring, the execution of the SOx purging control is prohibited.

On the other hand, when a predetermined temperature difference exists between the actual sensor value $T_{act}$ and the estimated sensor value $T_{ent\_est}$ although no system abnormality is occurring ($0<|T_{act}-T_{ent\_est}|\leq T_{thr}$), the abnormality determination module 82 determines that a change in heat values is occurring in association with the deterioration of each of the catalysts 31, 32. When the abnormality determination module 82 determines that a change in heat values is occurring, a deterioration correction coefficient calculating module 83 calculates a deterioration correction coefficient $D\_{corr}$.

The deterioration correction coefficient calculating module 83 calculates a deterioration correction coefficient $D\_{corr}$ that denotes a degree of deterioration of each of the catalysts 31, 32 based on the following expression (3) in which the difference between the actual sensor value $T_{act}$ and the estimated sensor value $T_{ent\_est}$ is multiplied by a predetermined coefficient C and what results is then integrated.

[Expression 3]

$$D\_{corr} = \int C \cdot (T_{est} - T_{ent\_est}) \quad (3)$$

The deterioration correction coefficients $D\_{corr}$ that are obtained from the expression (3) are inputted individually to, as described above, the oxidation catalyst temperature estimating module 77 and the NOx catalyst temperature estimating module 78 as heat generation properties of each of the catalysts 31, 32 so that heat values of HC and CO in the interiors of the catalysts that are calculated by those estimating modules 77, 78 are multiplied by the deterioration coefficients $D\_{corr}$.

In this way, in this embodiment, whether or not a system abnormality is occurring is determined based on the difference between the actual sensor value $T_{act}$ of the second exhaust gas temperature sensor 44 and the estimated value $T_{end\_est}$, and when a system abnormality is determined to be occurring, the SOx purging is prohibited. By doing so, it is possible to prevent effectively the excessive exhaust gas temperature increase or the deterioration of fuel economy that would be brought about by the execution of SOx purging during the occurrence of system abnormality.

In case there exists a temperature difference between the actual sensor value $T_{act}$ and the estimated sensor value $T_{ent\_est}$ although no system abnormality is occurring, deterioration correction coefficients $D\_{corr}$ of each of the catalysts 31, 32 are calculated based on the temperature difference and are then used in estimating heat values of HC and CO in the interiors of the catalysts. By doing so, the heat values of HC and CO can be calculated accurately according to the heat generation properties which change with the deterioration of each of the catalysts 31, 32, and also the accuracy of estimating the temperature in the interiors of the catalysts can be efficiently improved.

[Determination of End of SOx Purging Control]

The SOx purging control ends by setting off the SOx purging flag $F_{SP}$ when anyone of the following conditions is met: (1) injection amounts in the exhaust pipe injection or the post injection are accumulated since when the SOx purging flag $F_{SP}$ was set on and the accumulated injection amounts reach an upper threshold amount; (2) an elapsing time that has been counted since the start of the SOx purging control reaches an upper threshold time; and (3) a SOx adsorption amount of the NOx storage reduction catalyst 32 that is calculated based on the model expression that includes the operating state of the engine 10 and the sensor value of the NOx/lambda sensor 45, as input signals, is lowered to a predetermined threshold that indicates that SOx is removed successively (refer to the time $t_4$ in FIG. 2 and a time $t_n$ in FIG. 5).

In this way, in this embodiment, it is possible to prevent effectively the fuel consumption amount from becoming excessive in case the SOx purging does not progress as expected due to a reduction in exhaust gas temperature by providing the upper limits to the accumulated injection amounts and the elapsing time as the conditions under which the SOx purging control ends.

[MAF Tracking Control]

A MAF tracking control module 85 executes a control to correct a fuel injection timing and a fuel infection amount of each of the direct injection injectors 11 during the following periods of time: (1) a period of time when the normal operation in a lean state is switched to the rich state by executing the SOx purging control; and (2) the rich state by executing the SOx purging control is switched to the normal operation in a lean state (referred to as a MAF tracking control).

[Injection Amount Learning Correction]

Figure 8:
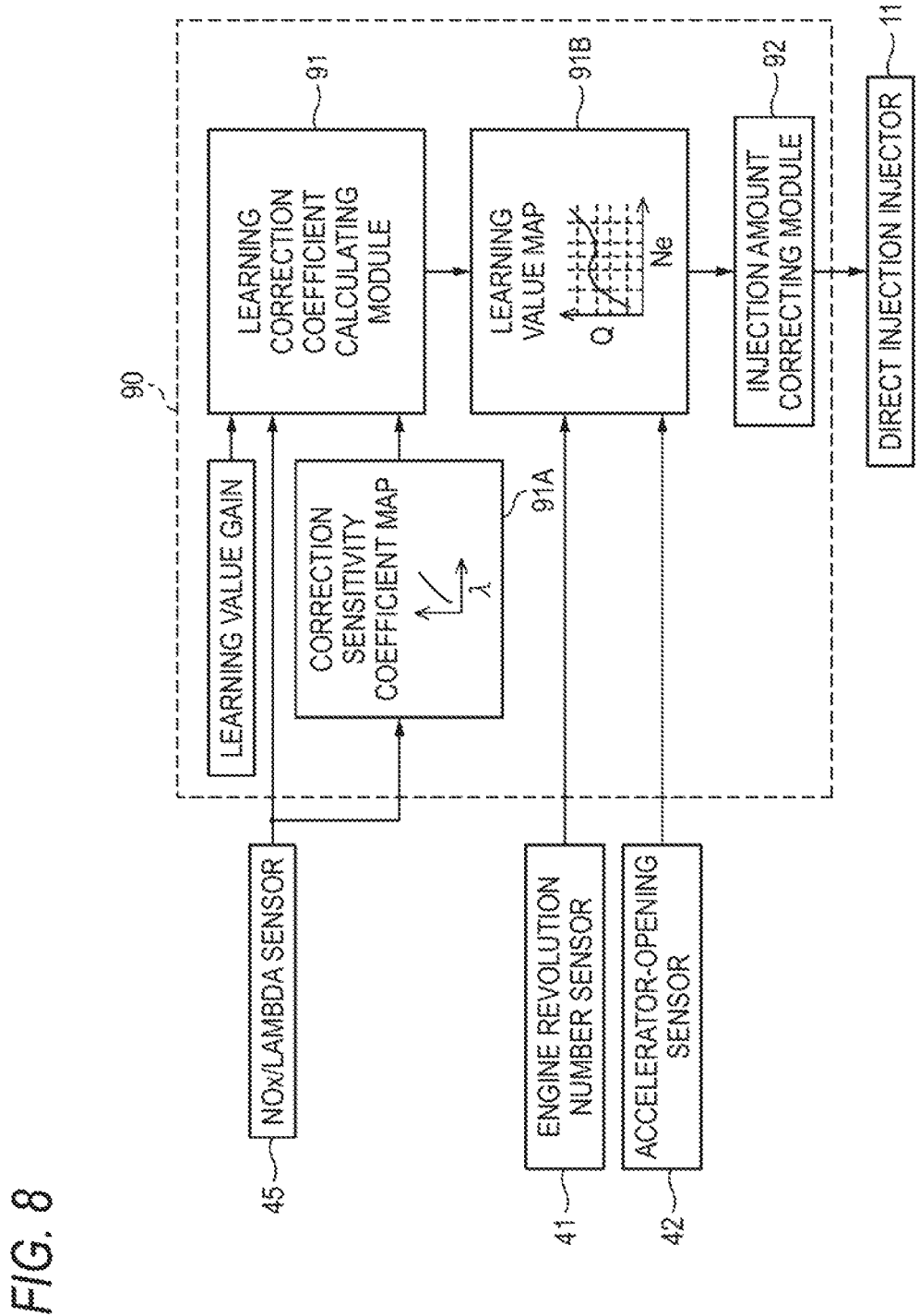
FIG. 8 is a block diagram illustrating a process of an injection amount learning correction of the injector according to the embodiment.

As shown in FIG. 8, the injection amount learning correcting module 90 has a learning correction coefficient calculating module 91 and an injection amount correcting module 92.

Figure 9:
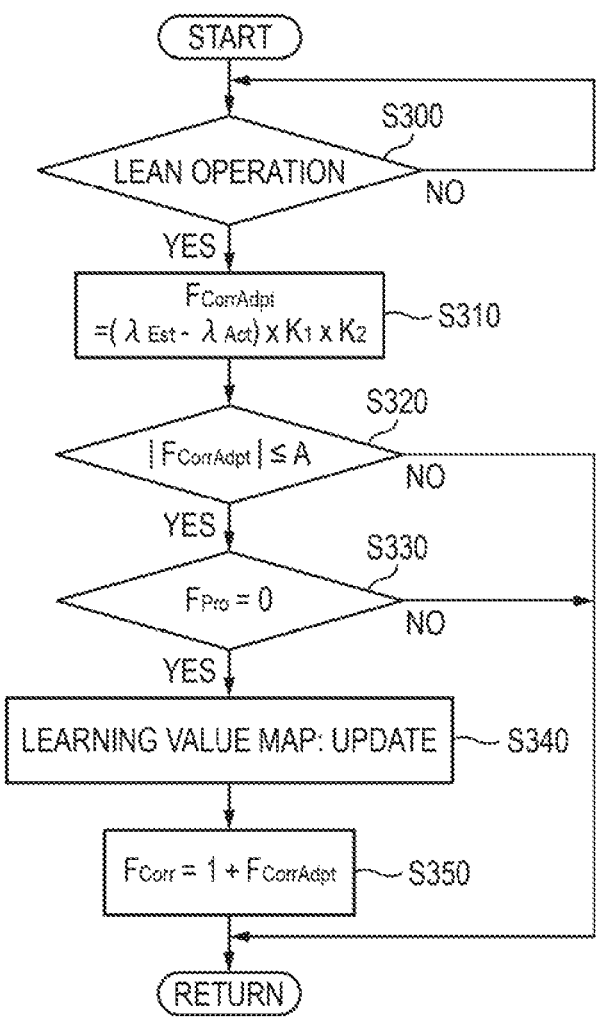
FIG. 9 is a flow chart illustrating a calculation process of a learning correction coefficient according to the embodiment.

The learning correction coefficient calculating module 91 calculates a learning correction coefficient $F_{corr}$ for a fuel injection amount based on an error $\Delta\lambda$ between an actual lambda value $\lambda_{Act}$ that is detected by the NOx/lambda sensor 45 when the engine 10 operates in a lean state and an estimated lambda value $\lambda_{Est}$. Since the concentration of HC in exhaust gas is low when the exhaust gas is in the lean state, a change in exhaust gas lambda value due to an oxidation reaction of HC in the oxidation catalyst 31 is so little as to be ignored. Due to this, it is considered that the actual lambda value $\lambda_{Act}$ in exhaust gas that passes the oxidation catalyst 31 to be detected by the NOx/lambda sensor 45 at the downstream side coincides with the estimated lambda value $\lambda_{Est}$ in exhaust gas discharged from the engine 10. Due to this, in case an error $\Delta\lambda$ is caused between the actual lambda value $\lambda_{Act}$ and the estimated lambda value $\lambda_{Est}$, it can be assumed that the error $\Delta\lambda$ is caused by a difference between an instructed injection amount given to each of the direct injection injectors 11 and an actual injection amount therefrom. Hereinafter, a calculation process of a learning correction coefficient that is executed using the error $\Delta\lambda$ by the learning correction coefficient calculating module 91 will be described based on a flow of the calculation process shown in FIG. 9

In step S300, it is determined based on an engine revolution number Ne and an accelerator-opening Q whether or not the engine 10 is operating in a lean state. If it is determined that the engine 10 is operating in the lean state, the flow proceeds to step S310 to start a calculation of a learning correction coefficient.

In step S310, an error $\Delta\lambda$ that is obtained by subtracting an actual lambda value $\lambda_{Act}$ detected by the NOx/lambda sensor 45 from an estimated lambda value $\lambda_{Est}$ is multiplied by a learning value gain $K_1$ and a correction sensitivity coefficient $K_2$ to thereby calculate a learning value $F_{CorrAdpt}$ ($F_{CorrAdpt} = \lambda_{Est} - \lambda_{Act}) \times K_1 \times K_2$). The estimated lambda value $\lambda_{Est}$ is estimated and calculated from the operating state of the engine 10 that corresponds to the engine revolution number Ne and the accelerator-opening Q. The correction sensitivity coefficient $K_2$ is read from a correction sensitivity coefficient map 91A shown in FIG. 8 using the actual lambda value $\lambda_{Act}$ detected by the NOx/lambda sensor 45 as an input signal.

In step S320, it is determined whether or not an absolute value $|F_{CorrAdpt}|$ of the teaming value $F_{CorrAdpt}$ is within a range of a predetermined correction limit value A. If it is determined that the absolute value $|F_{CorrAdpt}|$ exceeds the correction limit value A, this control is caused to proceed directly to return to end the current learning.

In step S330, it is determined whether or not a learning prohibition flag $F_{Pro}$ is off. As an example of a case where the learning prohibition flag $F_{Pro}$ is set on, a transient operation of the engine 10, a SOx purging control operation ($F_{SP}=1$) and a NOx purging control operation ($F_{NP}=1$) can be raised. The reason that the determination is made is that in such a state that those conditions are met, the error $\Delta\lambda$ becomes great due to the change in actual lambda value $\lambda_{Act}$ to thereby make it impossible to execute an accurate learning. In determining whether or not the engine 10 is in a transient operating state, for example, in case a variation with time of the actual lambda value $\lambda_{Act}$ that is detected by the NOx/lambda sensor 45 is greater than a predetermined threshold, it should be determined that the engine 10 is in the transient operating state.

In step S340, a learning value map 91B (refer to FIG. 8) that is referred to based on the engine revolution number Ne and the accelerator-opening Q is updated to the learning value $F_{CorrAdpt}$ that is calculated in step S310. To be more specific, a plurality of learning areas, which are defined according to engine revolution number Ne and accelerator-opening Q, are set on the learning value map 91B. These learning areas are preferably set so that those tending to be used more frequently are narrower whereas others tending to be used less frequently are wider. By setting the learning areas so, the learning accuracy is improved in the areas tending to be used more frequently, and the occurrence of non-learning can be prevented effectively in the areas tending to be used less frequently.

In step S350, a learning correction coefficient $F_{Corr}$ is calculated by adding "one" to a learning value that is read from the learning value map 91B using the engine revolution number Ne and the accelerator-opening Q as input signals ($F_{Corr} = 1 + F_{CorrAdpt}$). This learning correction coefficient $F_{Corr}$ is inputted into an injection amount correcting module 92 shown in FIG. 8.

The injection amount correcting module 92 executes corrections of fuel injection amounts for a pilot injection $Q_{Pilot}$, a pre-injection $Q_{Pre}$, a main injection $Q_{Main}$, an after-injection $Q_{After}$, and a post injection $Q_{Post}$ by multiplying each of basic injection amounts for those injections by the learning correction coefficient $F_{Corr}$.

In this way, it is possible to eliminate effectively variations resulting from the deterioration with age or property variation of each of the direct injection injectors 11 or the individual difference thereof by correcting the fuel injection amounts of each of the direct injection injectors 11 with the leaning value corresponding to the error $\Delta\lambda$ between the estimated lambda value $\lambda_{Est}$ and the actual lambda value $\lambda_{Act}$.

[MAF Correction Coefficient]

The MAF correction coefficient calculating module 95 calculates a MAF correction coefficient $Maf\_{corr}$ that is used for setting a MAF target value $MAF_{SPL\_Trgt}$ or a target injection amount $Q_{SPR\_Trgt}$ for a SOx purging control operation.

In this embodiment, the fuel injection amount of each of the direct injection injectors 11 is corrected based on the error $\Delta\lambda$ between the actual lambda value $\lambda_{Act}$ detected by the NOx/lambda sensor 45 and the estimated lambda value $\lambda_{Est}$. However, since lambda is a ratio of air to fuel, the cause for the error $\Delta\lambda$ is not always the influence resulting from the difference between the instructed injection amount given to each of the direct injection injectors 11 and the actual injection amount therefrom. Namely, it is possible that not only errors of each of the direct injection injectors 11 but also an error of the MAF sensor 40 influences the lambda value error $\Delta\lambda$.

Figure 10:
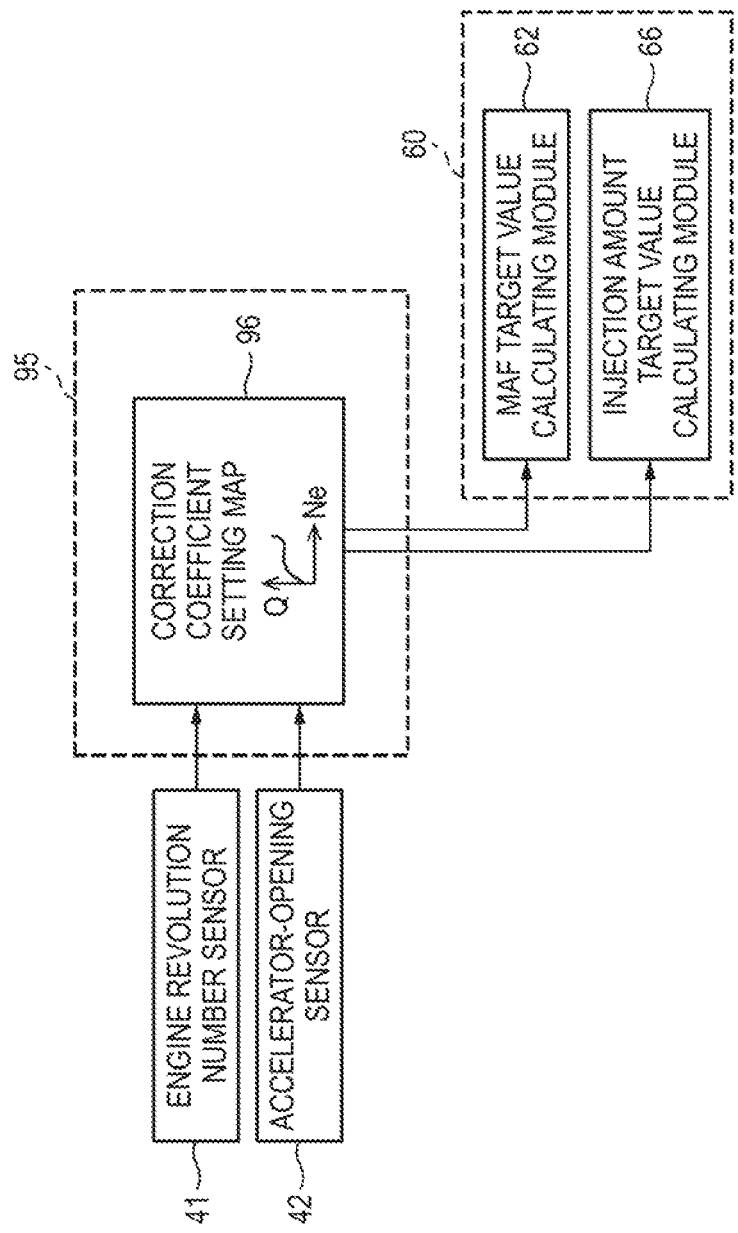
FIG. 10 is a block diagram illustrating a setting process of a MAF correction coefficient according to the embodiment.

FIG. 10 is a block diagram showing a setting process of a MAF correction coefficient $Maf\_{corr}$ by the MAF correction coefficient calculating module 95. A correction coefficient setting map 96 is a map that is referred to based on the engine revolution number Ne and the accelerator-opening Q, and MAF correction coefficients Maf_$corr$ indicating sensor properties of the MAF sensor 40 corresponding to engine revolution number Ne and accelerator-opening Q are set in advance through experiments in the map.

The MAF correction coefficient calculating module 95 reads a MAF correction coefficient Maf_$corr$ from the correction coefficient setting map 96 using the engine revolution number Ne and the accelerator-opening Q, as input signals, and transmits this MAF correction coefficient Maf_$corr$ to the MAF target value calculating module 62 and the injection amount target value calculating module 66. By doing so, it is possible to reflect effectively the sensor properties of the MAF sensor 40 to the setting of the MAF target value MAF$_{SPL\_Trgt}$ and the target injection amount Q$_{SPR\_Trgt}$ in operating the SOx purging control.

[Other Examples]

The present invention is not limited to the embodiment that has been described heretofore and hence can be carried out by being modified as required without departing from the spirit and scope of the present invention.

DESCRIPTION OF REFERENCE NUMERALS

10 Engine
11 Direct injection injector
12 In take passageway
13 Exhaust passageway
16 Intake throttle valve
24 EGR valve
31 Oxidation catalyst
32 NOx storage reduction catalyst
33 Filter
34 Exhaust injector
40 MAF sensor
45 NOx/lambdar sensor
50 ECU

What is claimed is:

1. An exhaust purification system comprising:
a NOx reduction catalyst that is provided on an exhaust passageway of an internal combustion engine to reduce and purify NOx in an exhaust gas;
an exhaust gas temperature sensor that is provided on a downstream side of the NOx reduction catalyst on the exhaust passageway; and
a control unit configured to:
execute a catalyst regeneration process of restoring a NOx purification capacity of the NOx reduction catalyst by switching an air-fuel ratio of the exhaust gas from a lean state to a rich state by using in parallel an air system control to reduce an intake air amount and an injection system control to increase a fuel injection amount;
estimate a catalyst temperature of the NOx reduction catalyst based on an operating state of the internal combustion engine;
estimate a sensor value of the exhaust gas temperature sensor based on the catalyst temperature; and
determine on an abnormality of the catalyst regeneration process based on a difference in temperature between an actual sensor value of the exhaust gas temperature sensor and the estimated sensor value in the midst of execution of the catalyst regeneration process,
wherein the control unit determines the abnormality when the difference continues to be higher than a predetermined upper limit threshold over a predetermined time or longer in the midst of execution of the catalyst regeneration process.

2. The exhaust purification system according to claim 1, wherein the control unit stops the catalyst regeneration process when the control unit determines the abnormality in the midst of execution of the catalyst regeneration process.

3. The exhaust purification system according to claim 1, wherein the control unit estimates a degree of deterioration of the NOx reduction catalyst based on the difference when the difference is greater than zero and equal to or smaller than the upper limit threshold.

4. The exhaust purification system according to claim 3, wherein the control unit estimates:
amounts of hydrocarbon and carbon monoxide that are discharged from the internal combustion engine based on the operating state of the internal combustion engine in the midst of execution of the catalyst regeneration process;
heat values of hydrocarbon and carbon monoxide in the NOx reduction catalyst based on the degree of deterioration and the amounts of hydrocarbon and carbon monoxide; and
the catalyst temperature of the NOx reduction catalyst based on at least the heat values of hydrocarbon and carbon monoxide.

5. An exhaust purification system comprising:
a NOx reduction catalyst that is disposed on an exhaust passageway of an internal combustion engine to reduce and purify NOx in an exhaust gas; an exhaust gas temperature sensor that is provided on a downstream side of the NOx reduction catalyst on the exhaust passageway to detect a temperature of the exhaust gas as a first exhaust gas temperature; and
a control unit configured to:
control at least one of an intake air flow rate and a fuel injection amount of the internal combustion engine;
execute a regeneration process of restoring a NOx purification capacity of the NOx reduction catalyst by controlling at least one of the intake air flow rate and the fuel injection amount so as to make the exhaust gas rich;
execute an exhaust gas temperature estimating process of calculating a second exhaust gas temperature in which a temperature of the exhaust gas is estimated based on an operating state of the internal combustion engine; and
execute an abnormality detecting process of detecting an abnormality in the regeneration process based on the first exhaust gas temperature that is detected by the exhaust gas temperature sensor and the second exhaust gas temperature calculated by the exhaust gas temperature estimating process in the midst of execution of the regeneration process,
wherein the control unit determines the abnormality when a difference between the first exhaust gas temperature and the second exhaust gas temperature continues to be higher than a predetermined upper limit threshold over a predetermined time or longer in the midst of execution of the catalyst regeneration process.

6. A method for restoring a NOx purification capacity in an exhaust purification system having an internal combustion engine and a NOx reduction catalyst that is disposed on an exhaust passageway of the internal combustion engine to reduce and purify NOx in an exhaust gas, the method comprising:

restoring the NOx purification capacity of the NOx reduction catalyst by controlling at least one of an intake air flow rate and a fuel injection amount of the internal combustion engine so as to make the exhaust gas rich;

detecting a temperature of the exhaust gas as a first exhaust gas temperature;

calculating a second exhaust gas temperature in which a temperature of the exhaust gas is estimated based on an operating state of the internal combustion engine; and detecting an abnormality in a regeneration process based on the first exhaust temperature and the second exhaust temperature in the midst of execution of the regeneration process, wherein the abnormality is determine when a difference between the first exhaust gas temperature and the second exhaust gas temperature continues to be higher than a predetermined upper limit threshold over a predetermined time or longer in the midst of execution of the catalyst regeneration process.

* * * * *